United States Patent [19]
Kerr et al.

[11] Patent Number: 5,662,382
[45] Date of Patent: Sep. 2, 1997

[54] VEHICLE SEAT WITH INTEGRAL CHILD RESTRAINT SEAT AND INTERLOCKING HEADREST ASSEMBLY

[75] Inventors: Eric J. Kerr, Westland; Paul J. Rozan, Shelby, both of Mich.

[73] Assignee: Lear Corporation, Southfield, Mich.

[21] Appl. No.: 683,576

[22] Filed: Jul. 15, 1996

[51] Int. Cl.⁶ .................................................. A47C 15/00
[52] U.S. Cl. ............................................ 297/238; 297/410
[58] Field of Search ................................. 297/410, 238, 297/391, 234

[56] References Cited

U.S. PATENT DOCUMENTS

| | | | |
|---|---|---|---|
| 2,701,606 | 2/1955 | Hascham et al. | 297/238 X |
| 3,979,150 | 9/1976 | Elzenbeck | 297/410 |
| 4,664,443 | 5/1987 | Casale | 297/238 |
| 4,854,639 | 8/1989 | Burleigh et al. | |
| 4,943,112 | 7/1990 | Law | 297/238 |
| 5,106,158 | 4/1992 | Dukatz et al. | |
| 5,224,756 | 7/1993 | Dukatz et al. | |
| 5,282,667 | 2/1994 | Elton et al. | |
| 5,282,668 | 2/1994 | Heussner et al. | |
| 5,312,156 | 5/1994 | Heussner et al. | |
| 5,366,270 | 11/1994 | Heussner et al. | |
| 5,380,060 | 1/1995 | Sponsler et al. | |
| 5,383,707 | 1/1995 | Osenkowski et al. | |
| 5,385,384 | 1/1995 | Gierman et al. | |
| 5,466,043 | 11/1995 | Lambert et al. | 297/238 |
| 5,498,062 | 3/1996 | Holdampf | 297/238 |
| 5,540,479 | 7/1996 | Thomas et al. | 297/238 X |

Primary Examiner—Milton Nelson, Jr.
Attorney, Agent, or Firm—Howard & Howard

[57] ABSTRACT

A vehicle seat assembly having a seat back, a seat bottom and a headrest coupled to the seat back and slidably moveable between a lower position against the seat back and an upper position spaced above the seat back. A child restraint seat is recessed in the seat back and pivotal between a folded position against the seat back and an unfolded use position extending downwardly against the seat bottom. An interlocking member includes a support housing for slidably receiving the headrest and a latch coupled to the support housing interacts between the headrest and child seat for locking the child seat in the folded position in response to the headrest being raised to any selective position above the lower position and unlocking the child seat to allow pivotal movement to the unfolded use position when the headrest is in the lower position. The interlocking member also includes a blocking member to prevent the headrest from being raised from the lower to upper position when the child seat is in the unfolded use position.

16 Claims, 3 Drawing Sheets

VEHICLE SEAT WITH INTEGRAL CHILD RESTRAINT SEAT AND INTERLOCKING HEADREST ASSEMBLY

TECHNICAL FIELD

The subject invention relates to a vehicle seat assembly having an integral child restraint seat and, more particularly, to an interlocking latch mechanism for interlocking the headrest of the vehicle seat and the child restraint seat in the folded position.

BACKGROUND OF THE INVENTION

It is becoming increasingly common to provide an automotive vehicle seat assembly with an integral child restraint seat for safely restraining an infant or child in the vehicle seat. The vehicle seat assembly generally includes an upright seat back, a horizontal seat bottom and a headrest assembly attached to the upper portion of the seat back and commonly adjustable in the vertical direction from a lower position against the top of the seat back to a raised position spaced above the top of the seat back.

The integral child restraint seat commonly includes a child backrest portion recessed in a cavity in the front face of the adult seat back and a child seat portion pivotally secured to the child backrest a pivotal between a folded position against the adult seat back and an unfolded use position extended downwardly against the adult seat bottom portion.

The U.S. Pat. Nos. 5,282,668; 5,312,156 and 5,336,270 to Heussner et al., and assigned to the present assignee, each disclose integral child restraint seats recessed in the adult seat back and pivotal between a folded position and an unfolded use position for restraining a child in the seat. These patents also disclose a moveable headrest which forms a portion of the adult seat back with the child seat in the folded position and forms a child headrest or extended child backrest with the child seat in the unfolded use position.

However, it remains desirable to provide a child restraint seat and latch mechanism which ensures that the headrest assembly is in the proper lower position for use with the child restraint seat in the unfolded use position and also locks and prevents use of the child restraint seat if the headrest is raised toward the upper position spaced from the adult seat back cushion.

SUMMARY OF THE INVENTION

A vehicle seat assembly comprises a generally horizontal seat bottom portion and a generally upright seat back portion. A child restraint seat is pivotal between a folded position against the seat back portion and an unfolded use position extending downwardly to a generally horizontal position against the seat portion. A headrest member is coupled to the seat back and selectively moveable between a lower position against the seat back and an upper position spaced above the seat back and an interlocking latch member is secured to the seat back and interacts between the headrest and the child restraint seat for locking the child restraint seat in the folded position in response to the headrest being raised from the lower position to the upper position and unlocking the child restraint seat to allow pivotal movement to the unfolded use position in response to the headrest being moved to the lower position.

BRIEF DESCRIPTION OF THE DRAWINGS

Other advantages of the subject invention will be readily appreciated as the same becomes better understood by reference to the following detailed description when considered in connection with the accompanying drawings wherein.

DETAILED DESCRIPTION OF THE PREFERRED EMBODIMENT

Figure 1:
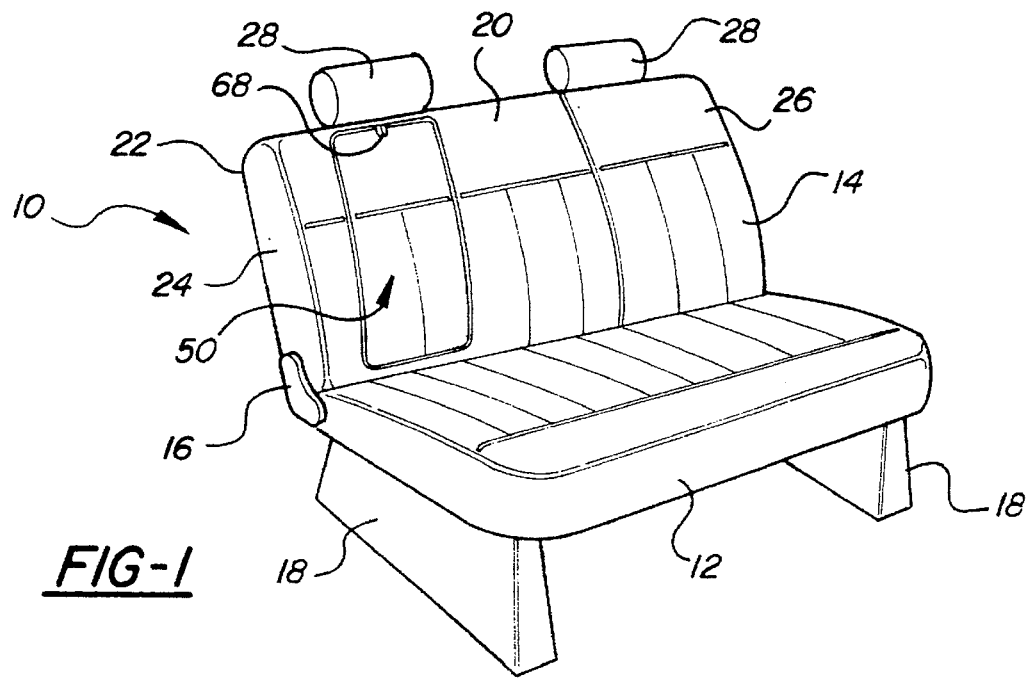
FIG. 1 is a perspective view of a vehicle seat assembly and child restraint seat in the folded position.

Referring to the drawings wherein like numerals indicate like or corresponding parts throughout the several views, an automotive vehicle rear bench-type seat is generally at 10. The seat assembly 10 comprises a generally horizontal seat bottom portion 12 upon which an occupant sits, and a generally upright seat back portion 14 coupled to the seat bottom 12 by a bracket, which may be a pivot bracket 16. The seat bottom 12 is supported and spaced above the vehicle floor (not shown) by a pair of risers 18.

Each of the seat bottom 12 and seat back 14 typically include a rigid frame structure usually of tubular or stamped metal construction. The seat frame is commonly covers by a resilient contoured foam cushion consisting of polyester or the like and encased in a trim cover typically of upholstered cloth fabric, vinyl or leather. More specifically, the seat back 14 includes a front surface 20, a rear surface 22 and opposing first and second sides 24,26, commonly referred to as bolsters.

Figure 5:
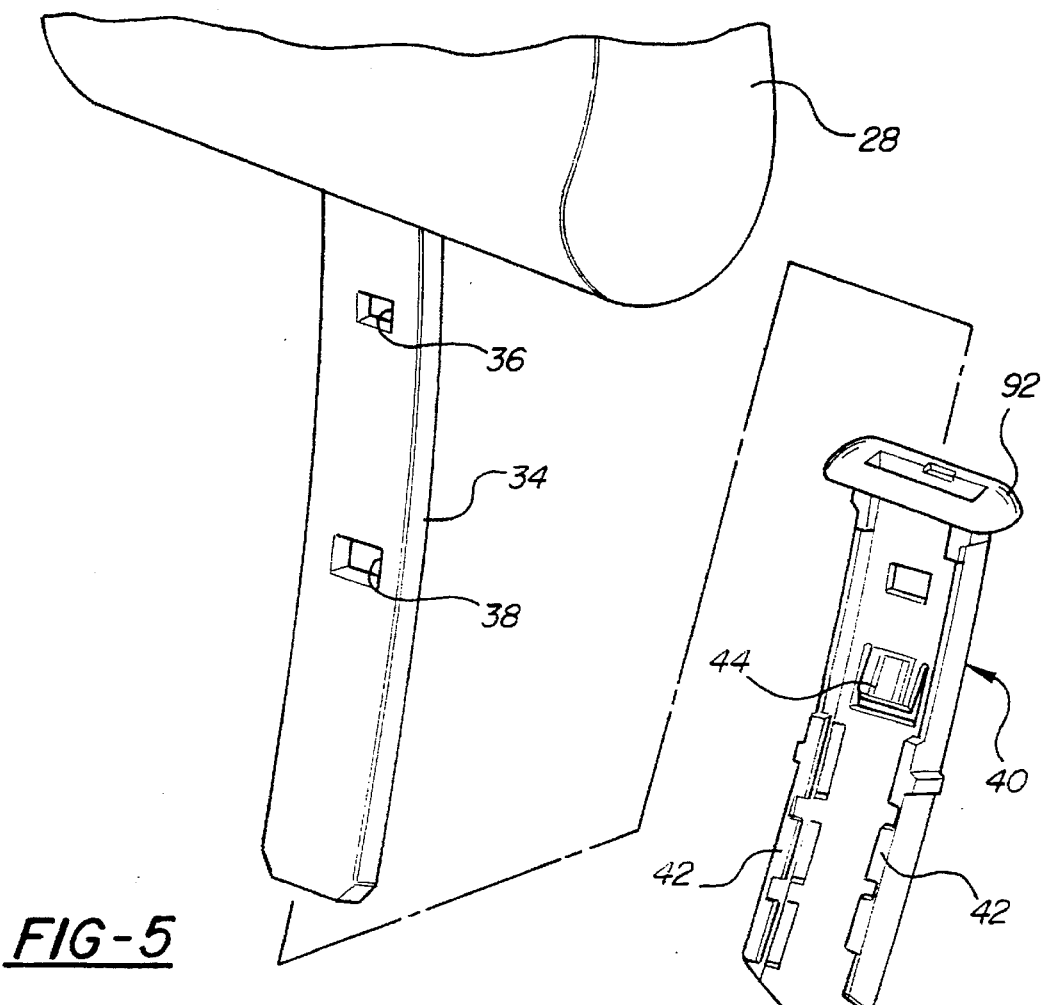
FIG. 5 is an exploded view of the interlocking latch mechanism and headrest assembly of the subject invention.

The seat assembly 10 also includes a headrest member 28 coupled to the seat back 14 and selectively moveable between a lower position against the seat back 14 and an upper position spaced above the seat back 14. The headrest 28 also includes a rigid frame (not shown) covered by a foam cushion 30 and trim cover 32. A rigid headrest guide post 34 extends downwardly from the bottom of the headrest 28 and includes a pair of spaced apart, generally rectangular, apertures 36, 38 therethrough, as shown in FIG. 5. A headrest guide sleeve 40 wraps at least partially around the guide post 34 for securing the headrest 28 to the seat back 14 and for providing selective vertical movement or positioning of the headrest 28 between the upper and lower positions. The guide sleeve 40 includes a plurality of tabs 42 in frictional contact with the guide post 34 to assist in maintaining the selective position and a inwardly extending stop tab 44 which engages the lower aperture 38 in the upper position to prevent the headrest 28 from being removed from the guide sleeve 40 and hence the seat back 14. The guide sleeve 40 is fixedly secured to the seat back 14 as will be further described hereinbelow.

Referring to FIGS. 1–4, the seat 10 further includes a cavity 46 recessed in the front surface 20 of the seat back 14 for receiving a integral child restraint seat as generally indicated at 50. The cavity 46 is disposed between the side bolsters 24,26 and forms a portion of the seat back 14 extending from the seat bottom 12 to the upper end of the seat back 14.

The child restraint seat 50 comprises a child seat portion 52 pivotally secured at one end to the adult passenger seat 10 and pivotal between a folded position recessed in the cavity 46 against the seat back 14 forming a lower portion of the seat back 14 and an unfolded use position pivoted downwardly to a generally horizontal position lying or resting parallel against the seat bottom portion 12. The child seat portion 52 includes a rigid seat pan 54 encased in a foam cushion pad 56 and covered by a layer of trim cover 58. A child backrest portion 60 is disposed against the back wall of the cavity 46 and includes a foam cushion support pad 62 cover by a layer of trim cover 64. The child seat portion 52 further includes a locking member 66 extending from said child seat pan 54 toward said child backrest 60. The locking member 66 comprises a generally U-shaped cylindrical bar having a pair of legs pivotally connected to the seat pan 54.

The subject invention includes an interlocking member 70 secured to the seat back 14 and interacting between the headrest 28 and the child restraint seat 50 for locking the child restraint seat 50 in the folded position in response to the headrest 28 being raised from the lower position to the upper position and unlocking the child restraint seat 50 to allow pivotal movement to the unfolded use position in response to the headrest being moved to the lower position. Referring to FIGS. 2–5, the interlocking member 70 includes a bracket 72 fixedly secured to the seat back 14 for slidably receiving the headrest 28 between the upper and lower positions. The bracket 72 includes a downwardly extending flange 74 fixedly secured to the frame 76 of the seat back 14 by a bolt or the like. The bracket 72 further includes a support housing 78 extending forwardly from the flange 76 and having a front face 80, a back face 82 and spaced apart first 84 and second 86 sides interconnected by a top plate 88. The top plate 88 includes a generally rectangular opening 90 therethrough for slidably receiving the headrest post 34. More specifically, the headrest guide sleeve 40 is received through the opening 90 and fixedly secured to the support housing 78 to selective guide the headrest post 34 in the housing 78 and hence the headrest 28 between the upper and lower positions. A cylindrical retainer ring 92 at the top of the guide sleeve 40 is seated on the top of the seat back 14 to cover over the support housing 78.

The interlocking member 70 further includes a latch 94 operatively connected to the bracket 72 for engaging and locking the child restraint seat 50 in the folded position with the headrest 28 in a selective position raised above the lower position. The latch 94 comprises a base member 96 coupled to the support housing 78 and a latch claw 98 pivotally connected to the base member 96. The base member 96 and latch claw 98 are slidable along the support housing 78 between a closed position locking the child seat 50 in the folded position and an open position unlocking the latch 94 and child seat 50 to allow movement to the unfolded use position.

The latch claw 98 includes a first 100 and second 102 end and the base member 96 includes a first 104 and second 106 end. The second ends 102,106 of the respective latch claw 98 and base member 96 are pivotally interconnected by a pivot rod 108.

The base member 96 of the latch 94 includes a pair of spaced apart base rails 110,112 interconnected adjacent the second end 106 by a cross support member 114. A blocking member 116 extends from the cross support member 114 between the pair of base rails 110,112 toward the first end 104 and is received in the aperture 36 in the headrest guide post 34 when the headrest 28 is in the lower position as will be further described in detail below. The latch 94 is received through an opening 118 in the front face 80 of the support housing 78. The first 84 and second 86 sides of the housing 78 each include a longitudinal slot 120,122 extending from the front face 80 toward the back face 82. Each of the base rails 110,112 of the base member 96 include a guide tab 124,126 extending outwardly therefrom adjacent the first end 104 and slidably received in the respective longitudinal slot 120,122 in the support housing 78 for providing sliding movement of the latch 94 between the open and closed positions.

The latch claw 98 includes a pair of spaced apart fingers 128,130 extending between the first 100 and second 102 ends and interconnected at the second end 102 by a cross support plate 131. The second ends 102,106 of the fingers 128,130 and base rails 110,112 are pivotally connected by the pivot rod 108. The first end 100 of the fingers 128,130 are interconnected by a retainer bar 132. The first end 100 of each of the fingers 128,130 further comprises a downwardly extending hook 134 for engaging the locking member 66 on the child seat portion 52. The hook 134 has a generally vertical inner surface section 136 and an inwardly angle surface 138 which form about a 120 degree angle therebetween.

A coil spring 140 is seated around the pivot rod 108 and includes a pair of opposing spring barbs 142,144 for urging or biasing the first end 100 of the latch claw 98 space away from the first end 104 of the base member 96. More specifically, the spring barb 142 engages the cross support member 114 of the base member 96 and the spring barb 144 engages the cross support plate 131 of the latch claw 98.

Finally, the support housing further includes a camming structure 146 for engaging the retainer bar 132 and urging the latch claw 98 toward the base member 96 in response to the latch 94 sliding along the slots 120,122 in the support housing 78 from the front face 80 toward the back face 82 for closing the locking member 66 between the latch claw 98 and the base member 96 in response to the child seat 50 being pivoted to the folded position. The camming structure 146 includes of spaced apart cam lobes 148,150 extending downwardly from the inside of the top plate 88 of the support housing 78. Each cam lobe 148,150 includes a inwardly angled cam surface 152 for engaging the retainer bar 132 and a detent 154 for retaining the bar 132 against the camming structure 146 and the latch claw 98 in the closed position.

Figure 2:
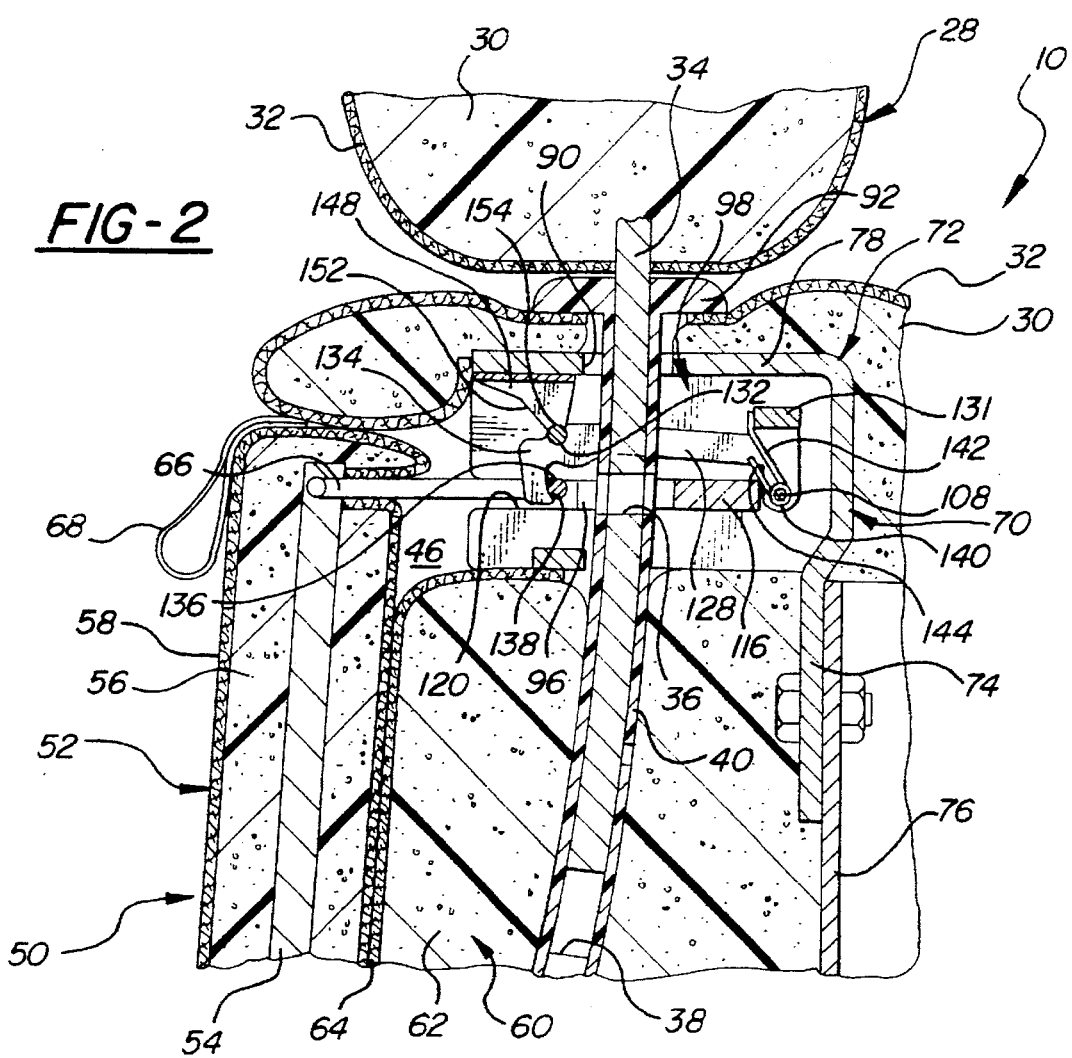
FIG. 2 is a fragmentary cross-sectional view of the interlocking latch mechanism with the headrest in the lower position and the child restraint seat in the folded position.

In operation, FIG. 2 shows the headrest 28 in the lower position and the child restraint seat 50 in the folded position. The latch 94 is closed to retain the locking member 66 between the latch claw 98 and the base member 96. The latch claw 98 is closed toward the base member 96 against the force of the spring 140 by the camming structure 146. That is, the spring 140 forces the retainer bar 132 against the detents 154 on the cam lobes 148,150 to maintain the latch 94 in the closed position around the locking member 66 to prevent incident gravitational forces from opening the child seat 50.

Figure 3:
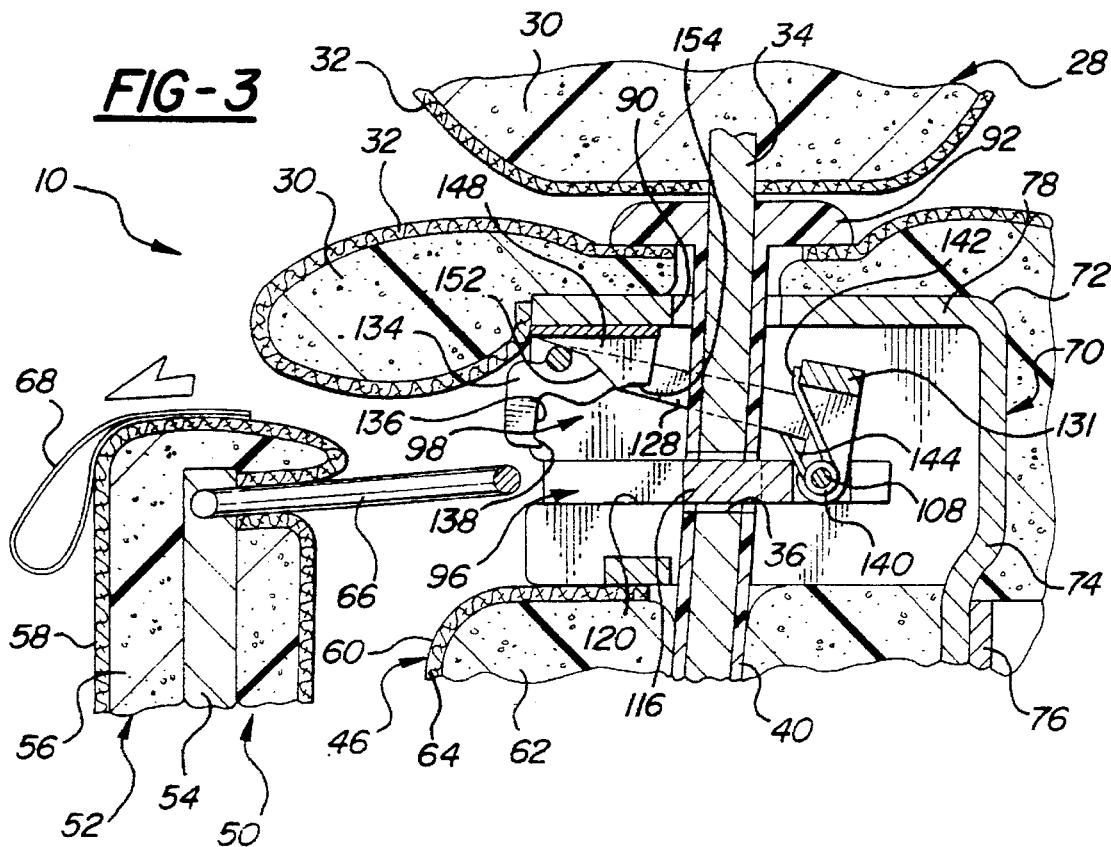
FIG. 3 is a fragmentary cross-sectional view of the interlocking latch mechanism unlocking the child restraint seat from the folded position and retaining the headrest in the lower position.

Referring to FIGS. 2 and 3, with the headrest 28 in the lower position, if it is desirable to utilize the child restraint seat 50, the user may pull forward on the child seat strap 68 to pivot the child seat portion 52 from the folded position to the unfolded use position. The locking member 66 pulls on the hooks 134 of the fingers 128,130 on the latch claw 98 to urge the guide tabs 124,126 on the base member 96 to slide along the slots 120,122 in the support housing 78. The headrest guide post 34 and guide sleeve 40 are extending through the support housing 78 between the first 100,104 and second 102,106 ends of the latch claw 98 and base member 96 and the aperture 36 is aligned to receive the blocking member 116 therethrough. As the blocking member 116 extends into the aperture 36 the latch 94 is free to slide forward in the support housing 78. The force of the spring 140 urges the retainer bar 132 to slide along the cam surface 152 of each cam lobe 148,150 to pivot the latch claw 98 away from the base member 96 to the open position. The locking member 66 is thus released from the latch 94 and the child seat may be pivoted to the unfolded use position.

However, with the child seat 50 in the unfolded use position and the latch 94 in the opened position, the blocking member 116 inserted into the aperture 36 in the guide post 34 prevent the use or raising of the headrest 28 from the lower position. This ensures that the headrest 28 remains against the seat back 14 and align with the child backrest 60 and to prevent exposure of the guide post 34 with the child seating area.

Upon return of the child seat 50 from the unfolded use position to the folded position, the locking member contacts the first end 104 of the base member 96 to force the guide tabs 124,126 to slide rearwardly along the slots 120,122 in the support housing 78. The retainer bar 132 engages and rides down the cam surfaces 152 on the cam lobes 148,150 to pivot the latch claw 98 against the base member 96 against the force of the spring 140 to the closed position.

Figure 4:
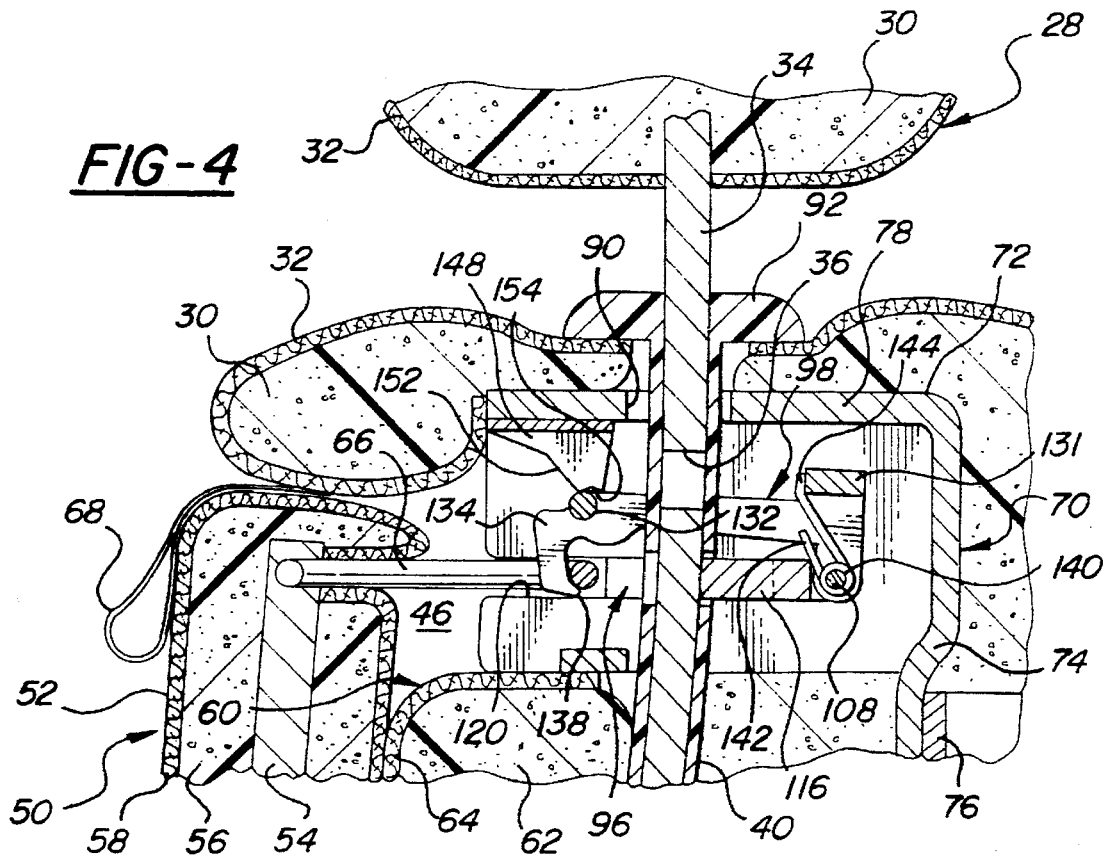
FIG. 4 is a fragmentary cross-sectional view of the interlocking latch mechanism locking the child restraint seat in the folded position with the headrest raised from the lower position.

As shown in FIG. 4, with the child seat 50 in the folded position and the latch 94 in the closed position, the blocking member 116 is removed from the aperture 36 in the guide post 34 and guide sleeve 40. The headrest 28 may now be positioned to any number of selective positions between the lower and upper positions. If the headrest 28 is in any selective position above the lower position, the latch 94 remains locked in the closed position to maintain the child seat 50 in the folded position. More specifically, with the headrest 28 raised above the lower position, the aperture 36 in the guide post 34 is raised above or out of alignment with the blocking member 116 on the base member 96. Therefore, if the user attempts to pivot the child seat portion 52 to the unfolded use position, the blocking member 116 will abut against the back side of the guide post 34 and prevent the latch 94 from sliding along the support housing 78. Thus, the latch claw 98 is maintained closed against the base member 96 and the retainer bar 132 is engaged with the detents 154 on the cam lobes 148,150 to lock the locking member 66 of the child seat portion 52 in the latch 94.

Finally, the interlocking member 70 also provides an inertia safety feature to maintain the child seat 50 in the closed position even if the headrest 28 is in the lower position when an excessive deceleration force, such as by a rear impact collision, is exerted on the seat assembly 10. Specifically, if the headrest is in the lower position, the latch 94 is free to slide forwardly in the support housing 78. The blocking member 116 will extend into the aperture 36 in the guide post 34 and guide sleeve 40, however, the cross support member 114 will engage the back side of the headrest guide post 34. In the position, the force of the spring 140 would normally pivot the latch claw 98 away from the base member 96 and unlock the locking member 66 from the latch 94. However, the excessive deceleration force creates a normal force exerted downwardly on the angled surface 138 of the hooks 134 on the latch claw 98. If this normal force pulling down of the hooks 134 of the latch claw 98 is greater than the bias force of the spring 140, the latch claw 98 will not pivot away from the base member 96 and thus the latch 94 will not open to release the locking member 66 and allow the child seat to pivot to the unfolded use position. When the deceleration force is diminished, the latch 94 returns to its normal closed position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A vehicle seat assembly comprising:
   a generally horizontal seat bottom portion;
   a generally upright seat back portion;
   a child restraint seat pivotal between a folded position against said seat back portion and an unfolded use position extending downwardly to a generally horizontal position against said seat bottom portion;
   a headrest member coupled to said seat back portion and selectively moveable between a lower position against said seat back portion and an upper position spaced above said seat back portion; and
   an interlocking member secured to said seat back portion and interacting between said headrest member and said child restraint seat for locking said child restraint seat in said folded position in response to said headrest member being raised from said lower position to said upper position and unlocking said child restraint seat to allow pivotal movement to said unfolded use position in response to said headrest member being moved to said lower position.

2. A vehicle seat assembly as set forth in claim 1 wherein said interlocking member includes a bracket fixedly secured to said seat back portion for slidably receiving said headrest member between said upper and lower positions.

3. A vehicle seat assembly as set forth in claim 2 wherein said interlocking member includes a latch operatively connected to said bracket for engaging and locking said child restraint seat in said folded position with said headrest member in a selective position raised above said lower position.

4. A vehicle seat assembly as set forth in claim 3 wherein said latch includes a base member coupled to said bracket and a latch claw pivotally connected to said base member, said base member and said latch claw slidable along said bracket between a closed position locking said child restraint seat in said folded position and an open position unlocking said child restraint seat to allow movement to said unfolded use position.

5. A vehicle seat assembly as set forth in claim 4 wherein said latch claw includes a first and second end and said base member includes a first and second end, said second ends of said respective latch claw and said base member being pivotally secured together.

6. A vehicle seat assembly as set forth in claim 5 wherein said latch includes a spring engaging said latch claw and said base member to bias said first end of said latch claw away from said first end of said base member.

7. A vehicle seat assembly as set forth in claim 6 wherein said bracket includes a support housing having a front face, a back face and spaced apart first and second sides interconnected by a top plate, said top plate having an opening therethrough for slidably receiving said headrest member.

8. A vehicle seat assembly as set forth in claim 7 wherein said first and second sides of said support housing including a longitudinal slot extending from said front face toward said back face, said base member of said latch including a pair of guide tabs slidably received in said longitudinal slot of each side of said support housing for providing movement of said latch between said open and closed positions.

9. A vehicle seat assembly as set forth in claim 8 wherein said headrest member includes a guide post extending downwardly from said headrest member and slidably received in said opening of said support housing.

10. A vehicle seat assembly as set forth in claim 9 wherein said headrest member further includes a guide sleeve extending around said guide post and extending through said opening in said support housing for providing selective positioning of said headrest member between said upper and lower positions.

11. A vehicle seat assembly as set forth in claim 10 wherein said headrest member guide post extends between said first and second ends of said latch in said support housing.

12. A vehicle seat assembly as set forth in claim 11 wherein said latch claw includes a pair of spaced apart fingers extending between said first and second ends and interconnected adjacent said first end by a retainer bar.

13. A vehicle seat assembly as set forth in claim 12 wherein said child seat includes a locking member extendable into said slots in said support housing for engagement with said latch claw.

14. A vehicle seat assembly as set forth in claim 13 wherein said support housing includes a camming structure for engaging said retainer bar and urging said latch claw toward said base member in response to said latch sliding along said slots from said front face toward said rear face for closing said locking member between said latch claw and said base member in response to said child restraint seat being pivoted to said folded position.

15. A vehicle seat assembly as set forth in claim 14 wherein said headrest member guide post includes an aperture therethrough and said base member of said latch includes a blocking member, said blocking member is received in said aperture with said headrest member in said lower position in response to said child seat being pivoted from said folded position to said unfolded position to lock said headrest member in said lower position while said child seat is in said unfolded use position.

16. A vehicle seat assembly as set forth in claim 15 wherein said blocking member engages said headrest member guide post when said headrest member is raised to a selective position above said lower position to prevent said latch from sliding in said support housing and lock said child restraint seat in said folded position.

* * * * *